F. STEFFENS.
CAR TRUCK.
APPLICATION FILED APR. 7, 1915.
1,172,497.
Patented Feb. 22, 1916.
3 SHEETS—SHEET 1.
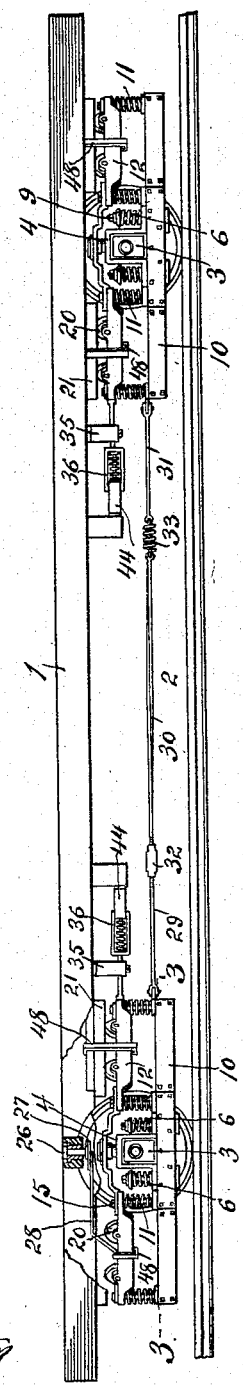
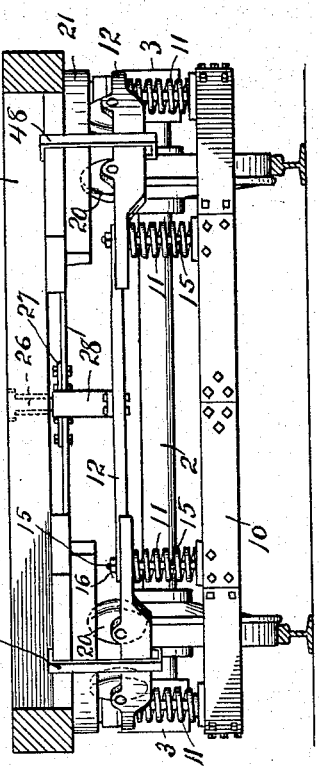
WITNESSES:
R. Hamilton
E. B. House
INVENTOR:
Fred Steffens
BY Warren D. House
His ATTORNEY.

F. STEFFENS.
CAR TRUCK.
APPLICATION FILED APR. 7, 1915.
1,172,497.
Patented Feb. 22, 1916.
3 SHEETS—SHEET 2.
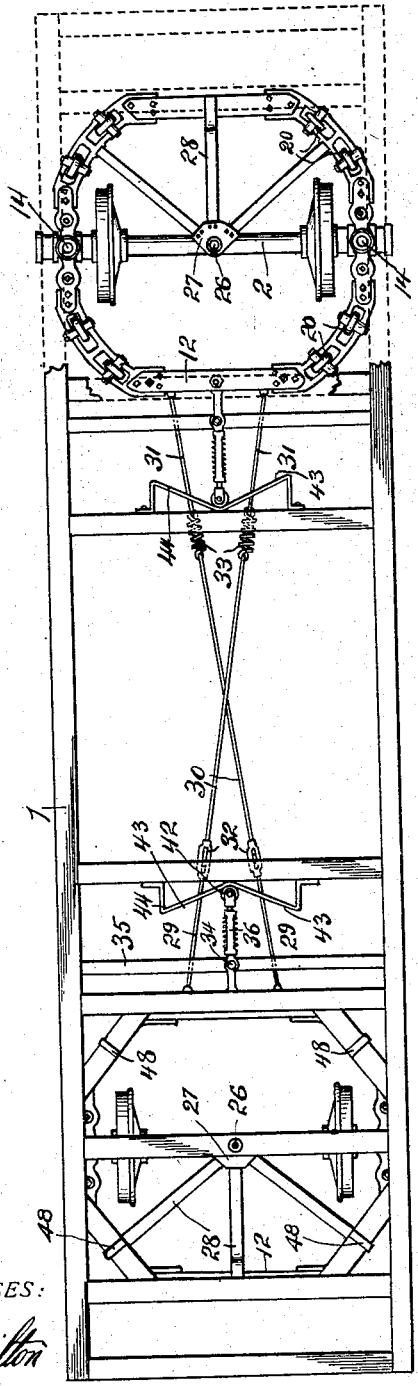
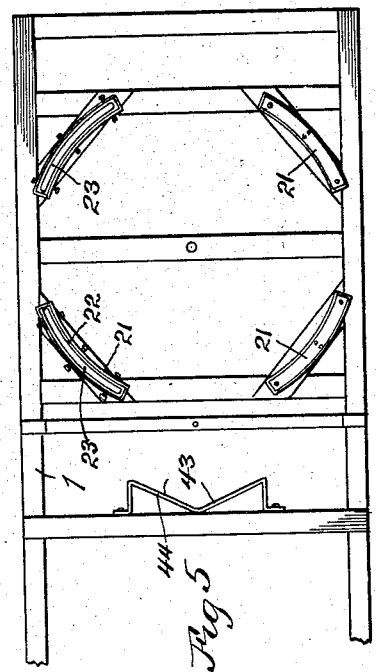
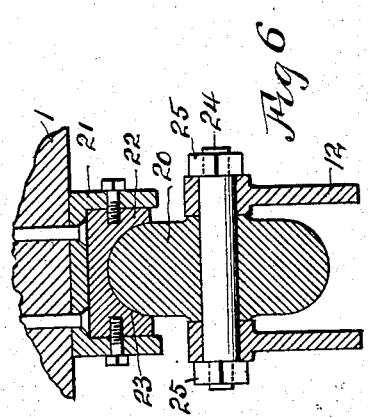
WITNESSES:
R. E. Hamilton
E. B. House.
INVENTOR.
Fred Steffens
BY Warren D. House
His ATTORNEY.

F. STEFFENS.
CAR TRUCK.
APPLICATION FILED APR. 7, 1915.
1,172,497.
Patented Feb. 22, 1916.
3 SHEETS—SHEET 3.
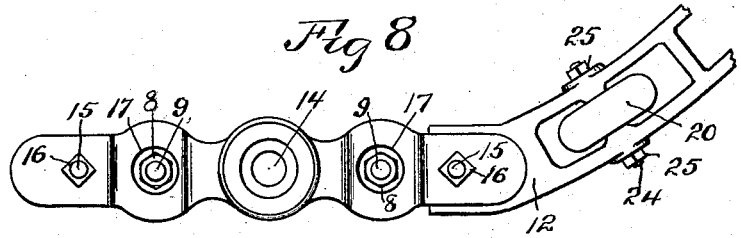
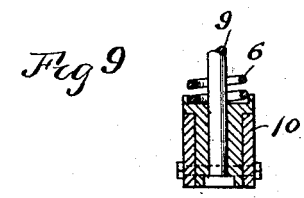
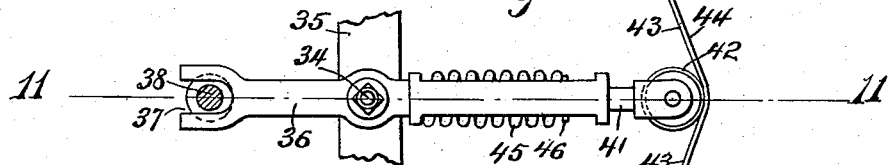
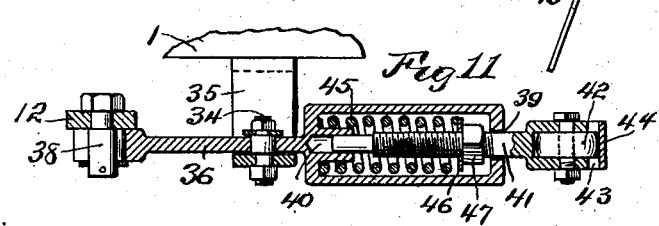
WITNESSES:
R. E. Hamilton
E. B. House
INVENTOR.
Fred Steffens
BY
Warren D. House
His ATTORNEY.
THE COLUMBIA PLANOGRAPH CO., WASHINGTON, D. C.

UNITED STATES PATENT OFFICE.

FRED STEFFENS, OF ST. JOSEPH, MISSOURI.

CAR-TRUCK.

1,172,497.  Specification of Letters Patent.  Patented Feb. 22, 1916.

Application filed April 7, 1915. Serial No. 19,625.

*To all whom it may concern:*

Be it known that I, FRED STEFFENS, a citizen of the United States, residing at St. Joseph, in the county of Buchanan and State of Missouri, have invented a certain new and useful Improvement in Car-Trucks, of which the following is a specification.

My invention relates to improvements in car trucks.

It relates particularly to car trucks of the single radial axle type.

The object of my invention is to provide a car truck of novel construction, which permits of the use of a long wheel base, while enabling the truck to turn sharp curves, which is strong and durable and not liable to get out of order, and which provides a support for the car body which possesses great resiliency.

My invention provides further novel means for guiding the front and rear trucks in making curves, and for automatically bringing the trucks into the straight ahead position on a straight track.

Other novel features of my invention are hereinafter fully described and claimed.

In the accompanying drawings, which illustrate the preferred embodiment of my invention, Figure 1 is a side elevation, partly broken away, of my improvement applied to a car body. Fig. 2 is an end elevation of my improved device, the sills of the car body being shown in cross section. Fig. 3 is a horizontal section on the line 3—3 of Fig. 1, showing one of the lower truck frames. Fig. 4 is a top view, partly broken away, of what is shown in Fig. 1. Fig. 5 is a bottom view of a portion of the car body, showing some of the roller runways or tracks. Fig. 6 is an enlarged vertical section through one of the rollers, which support the car body. Fig. 7 is an enlarged view, partly in side elevation and partly in vertical section, of parts of one of the trucks and one of the runways which is attached to the car body. Fig. 8 is a top view of a portion of what is shown in Fig. 7. Fig. 9 is a vertical sectional view on the line 9—9 of Fig. 7. Fig. 10 is a plan view, enlarged, of one of the mechanisms which serve to bring the trucks into the straight ahead position. Fig. 11 is a vertical sectional view on the line 11—11 of Fig. 10.

Similar reference characters designate similar parts in the different views.

1 designates the ordinary sill frame of a common railway car. The body is shown supported by two trucks, and, as these are alike in construction, a description of one will answer for both. Each truck is provided with a single axle 2 on which are mounted, in the usual manner, two boxes 3, Fig. 7, which respectively support two inverted U shaped yokes 4, the lower ends of which have lateral arms 5 upon which respectively rest the lower ends of vertical coil springs 6 upon the upper ends of which rest washers 7 which respectively support nuts 8 mounted on vertical bolts 9, which are vertically slidable in and the heads of which support a horizontal lower truck frame 10 of annular form. Upon the lower frame 10 rest the lower ends of coil springs 11, the upper ends of which support an annular upper truck frame 12, which is revoluble with the lower frame 10 and the axle 2, the upper frame 12 having two vertical holes 13 in which are respectively vertically slidable two upwardly extending studs 14 which respectively extend from the upper ends of the yokes 4. The coil springs 11 respectively encircle vertical bolts 15, which extend respectively through holes provided therefor in the lower frame 10 and the upper frame 12. The heads on the lower ends of the bolts 15 are adapted to bear against the lower side of the lower frame 10, and nuts 16 mounted upon the upper ends of said bolts bear against the upper side of the upper frame 12, see Fig. 7. For permitting sufficient vertical movement of the frame 12 it may be provided with vertical holes 17, Fig. 7, adapted to receive the upper ends of the bolts 9 and the nuts 8. As shown in Fig. 7, the holes 13 may have bushings 18 respectively fitted therein, and wear caps 19 may be respectively mounted on the studs 14 and slidably fitted respectively in the bushings 18.

For supporting the sill frame 1 revolubly on the upper truck frame 12, there are, preferably, rotatably mounted on the frame 12 rollers 20, arranged in pairs, Figs. 4, 5 and 6, each pair of rollers being mounted in an arcuate track comprising a horizontal curved channel member 21, which is secured to the under side of the sill frame 1, and which has secured in it a curved member 22, Figs. 5 and 7, the under side of which is provided with two vertically and, preferably concavely curved recesses 23, semi-circular in cross section, Fig. 6, in which are respectively mounted and adapted to run two of the rollers 20, the latter being, preferably, semi-circular in cross section. As shown in Fig. 6, the rollers 20 may be respectively rotatably mounted on horizontal shafts 24, the opposite ends of each of which are shouldered and screw threaded and have respectively mounted thereon nuts 25. The recesses 23 lie in a circle the center of which is in a vertical line intersecting the axis of the adjacent axle 2 at the middle thereof. The sill frame 1 is provided in said line with a vertical hole in which is mounted a king bolt 26, the lower end of which is secured to a plate 27, Fig. 4, to which are secured the inner ends of radial bars 28, the outer ends of which are secured to the upper truck frame 12.

To make the two trucks track in turning curves, two crossed members have one set of ends secured to one lower frame 10, the other set of ends being secured to the other lower frame 10. Preferably these crossed members comprise each three rods 29, 30 and 31. A turn buckle 32 connects the adjacent ends of the rods 29 and 30, and a coil spring 33 connects the adjacent ends of the rods 30 and 31. The other ends of the rods 29 and 31 are respectively secured to the lower truck frames 10. Each of the crossed members, by reason of the coil spring 33, is longitudinally resilient, so that the member may extend or contract to suit the positions of the trucks on the track. Owing to the recesses 23 being concavely curved, the weight of the car body on the rollers 20 will normally tend to force the trucks to the straight ahead position, the deepest parts of said recesses containing the rollers when the trucks are in the straight ahead position, that is, when the axles 2 are at right angles to the longitudinal center of the sill frame 1.

For the purpose of quickly and certainly bringing the trucks to the straight ahead position, when the car is on a straight track, auxiliary means are, preferably, provided. Each truck is preferably controlled by one of these auxiliary means. As both of said auxiliary means are alike, a description of one will suffice for both. Pivoted by means of a vertical bolt 34 mounted in a cross bar 35, which is secured to the sill frame 1, is a horizontal longitudinal lever 36, the outer end of which is provided with a recess 37 in which is mounted a vertical bolt 38, which is secured to the adjacent upper truck frame 12, Figs. 4, 10 and 11. The other end of the lever 36 is provided with a longitudinal hole 39 and a recess 40 in which is slidably mounted a member comprising a bar 41, the outer end of which has mounted on it a roller 42 adapted for travel along two converging faces 43 of an abutment comprising a bracket 44, which is secured to the sill frame 1. Encircling the bar 41 is a coil spring 45, the outer end of which bears against the lever 36, and the inner end of which bears against a washer 46 which in turn bears against a nut 47, which is mounted on a threaded portion of the bar 41.

In the operation of my invention, when one of the trucks starts on a curve, the crossed connecting members cause the other truck to tend to swing in the opposite direction, thus enabling the wheels of the two trucks to easily track. As the trucks swing from the straight ahead position, the rollers 20 travel toward the ends of the recesses 23, and the rollers 42 run outwardly on the faces 43 of the bracket abutments 44. As said faces 43 are tangent to a circle of less radius than the radius of the circle the center of which is the bolt 34 and the circumference of which is the middle of the bracket 44, the springs 45 will be compressed. When the trucks leave the curve and strike a straight track, the weight of the car body on the rollers 20 and the springs 45 bearing against the faces 43, will swing the upper truck frames 12 and with them the lower truck frames 10 and the axles 2 to the straight ahead position, the revoluble movement of the lower truck frames 10 being effected by reason of the sliding engagement of the studs 14 with the upper frames 12 and the engagement of the yokes 4 with the frames 10. In order that the trucks may not be detached from the car body by accident, such as derailment, hangers 48 are respectively secured to the sill frame 1 and loosely embrace the upper truck frames 12, so as to permit free revolving movement thereof.

I do not limit my invention to the structure shown and described, as modifications, within the scope of the appended claims, may be made without departing from the spirit of my invention.

What I claim is:—

1. In a car truck, a car body, an axle, a lower frame revoluble with the axle, means supported by the axle for supporting the frame, an upper frame revoluble relatively to the car body and with the lower frame, resilient means supported by the lower frame and supporting the upper frame, and means supported by the upper frame and supporting the car body.

2. In a car truck, a car body, an axle, a lower frame revoluble with the axle, means supported by the axle for supporting the frame, an upper frame revoluble relatively to the car body and with the lower frame, resilient means supported by the lower frame and supporting the upper frame, and rollers supported by the upper frame and supporting the car body.

3. In a car truck, a car body having an arcuate vertically curved runway, an axle, a lower frame revoluble with the axle, means supported by the axle for supporting said frame, an upper frame revoluble relatively to the car body and with said lower frame, resilient means supported by the lower frame and supporting said upper frame, and rollers supported by the upper frame and adapted for travel in said runway.

4. In a car truck, a car body having an arcuate runway curved in cross section, an axle, a lower frame revoluble with the axle, means supported by the axle for supporting said frame, an upper frame revoluble relatively to the car body and with the lower frame, resilient means supported by the lower frame and supporting said upper frame, and rollers supported by the upper frame and adapted to travel in said runway and having treads curved in cross section.

5. In a car truck, a car body having a horizontally arcuate vertically curved runway curved in cross section, an axle, a lower frame revoluble with the axle, means supported by the axle for supporting said frame, an upper frame revoluble relatively to the car body and with the lower frame, resilient means supported by the lower frame and supporting the upper frame, and rollers having treads curved in cross section and adapted to travel in said runway and supported by the upper frame.

6. In a car truck, a car body, an axle, two boxes on said axle, a lower frame revoluble with the axle, means, including two yokes respectively supported by the boxes, supporting said frame, an upper frame revoluble relatively to the car body and vertically slidably engaging said yokes, resilient means supported by the lower frame and supporting the upper frame, and means supported by the upper frame for supporting the car body.

7. In a car truck, a car body, an axle, two boxes on said axle, a lower frame revoluble with the axle, means, including two yokes respectively supported by said boxes and provided each with an upwardly extending stud, supporting said frame, an upper frame revoluble relatively to the car body and slidable vertically on said studs, resilient means supported by the lower frame and supporting the upper frame, and means supported by the upper frame for supporting the car body.

8. In a car truck, a car body, an axle, two boxes on said axle, a lower frame revoluble with the axle, two yokes respectively supported by said boxes, resilient means supported by said yokes and supporting said frame, an upper frame revoluble relatively to the car body and with said lower frame, resilient means supported by the lower frame and supporting the upper frame, and means supported by the upper frame for supporting the car body.

9. In a car truck, a car body, an axle, two boxes on said axle, a lower frame revoluble with the axle, means, including two yokes respectively supported by said boxes, supporting said frame, an upper frame revoluble relatively to said car body, and with said lower frame and vertically slidably engaging said yokes, resilient means supported by the lower frame and supporting the upper frame, and rollers supported by the upper frame and supporting the car body.

10. In a car truck, a car body, an axle, a lower frame revoluble with the axle, means supported by the axle for supporting the lower frame, an upper frame revoluble relatively to the car body and with the lower frame, resilient means supported by the lower frame and supporting the upper frame, means supported by the upper frame for supporting the car body, and yielding means connecting the car body and upper frame for normally forcing the upper frame to the straight ahead position.

11. In a car truck, a car body, an axle, a truck frame revoluble relatively to the car body and with the axle, means supported by the axle for supporting the truck frame, a lever pivoted to the car body and engaging said truck frame for normally swinging said frame to the straight ahead position, a member longitudinally slidable on said lever, an abutment carried by said car body and having two converging faces for engaging and forcing said member to the straight ahead position, a spring for normally forcing said member against said abutment, and means supported by said frame for supporting said car body.

12. In a car truck, a car body, a revoluble truck frame, means supported by the frame for supporting the car body, an abutment carried by the car body and having two converging faces, a lever pivoted to the car body and engaging the frame for swinging the frame to the straight ahead position, a member longitudinally movable on said lever and adapted to engage said faces, and a spring for normally forcing said member against said faces.

13. In a car truck, a car body, an axle, a lower frame revoluble with the axle, means supported by the axle for supporting said frame, an upper frame revoluble with the lower frame, resilient means supported by the lower frame and supporting the upper frame, an abutment carried by the body and having two converging faces, a lever pivoted to the car body and engaging one of said frames, a member longitudinally movable on said lever and engaging said abutment for swinging the lever to force the frame engaged thereby to the straight ahead position, a spring for forcing said member into engagement with said faces, and means supported by the upper frame for supporting said car body.

14. In a car truck, a car body, two axles, two lower frames respectively revoluble with said axles, two crossed members having one set of ends connected to one of said frames and the other set of ends connected to the other frame, two upper frames revoluble respectively with said lower frames, means supported by the upper frames for supporting said car body, resilient means on each of said lower frames for supporting the adjacent upper frame, and yielding means connected with the car body and one of said frames for normally forcing the frame to which it is connected to the straight ahead position.

15. In a car truck, a car body, two axles, two lower frames respectively revoluble with said axles, two crossed members having one set of ends connected to one of said frames and having the other set of ends connected to the other frame, two upper frames revoluble respectively with said lower frames, means supported by the upper frames for supporting said car body, resilient means supported by the lower frames for supporting the upper frames, means supported by said axles for supporting the lower frames, an abutment carried by said car body and having two converging faces, and means including a lever pivoted to the car body engaging one of said frames and said faces for normally forcing the frame engaged thereby to the straight ahead position.

16. In a car truck, a car body, two axles, two frames revoluble respectively with said axles, resilient means for supporting said frames by said axles respectively, and two crossed longitudinally resilient members having one set of ends secured to one of said frames and the other set of ends secured to the other of said frames.

17. In a car truck, a car body, two axles, two frames revoluble respectively with said axles, resilient means for supporting said frames respectively by said axles, two longitudinally resilient members crossing each other and having one set of ends secured to one of said frames and the other set of ends secured to the other frame, and yielding means connected to said car body and to one of said frames for normally forcing the frame to which it is connected to the straight ahead position.

18. In a car truck, a car body, two axles, two frames revoluble respectively with said axles, means for supporting said frames respectively by said axles, and two crossed longitudinally resilient members secured at one set of ends to one frame and at the other set of ends to the other frame.

19. In a car truck, a car body, an axle, a centrally pivoted truck frame revoluble with said axle, resilient means supported by said axle for supporting said frame, a track carried by said car body and having arcuate and vertically curved recesses, and rollers supported by said frame and respectively located in said recesses, the recesses being disposed so that the weight of the car body will normally force the frame and axle to the straight ahead position.

20. In a car truck, a car body, an axle, a centrally pivoted truck frame revoluble with the axle, resilient means supported by said axle for supporting said frame, rollers carried by said frame, and a track secured to said car body and supported by said rollers and provided with means by which the weight of the car body will normally force the frame and axle to the straight ahead position.

21. In a car truck, a car body, a centrally pivoted truck frame revoluble relatively to the car body, an axle revoluble with said frame, means supported by the axle for supporting said frame, rollers carried by said frame, and a track carried by the car body and supported by said rollers and provided with means by which the weight of the car body will normally force the frame and axle to the straight ahead position.

22. In a car truck, a car body, an axle, a truck frame revoluble with the axle and relatively to the car body, means supported by the axle for supporting the frame, rollers carried by said frame, a track carried by the car body and supported by said rollers and having means by which the weight of the car body normally forces said frame and the axle to the straight ahead position, and auxiliary yielding means connecting the frame and car body for normally forcing the frame and axle to the straight ahead position.

23. In a car truck, a car body, an axle, a centrally pivoted truck frame revoluble with the axle and relatively to the car body, means supported by the axle for supporting the frame, rollers carried by the frame, a track carried by and supporting the car body and supported by said rollers and provided with arcuate vertically curved recesses in which said rollers are respectively located, the recesses being so disposed that the weight of the car body will normally force the frame and axle to the straight ahead position.

24. In a car truck, a car body, an axle, a truck frame revoluble with the axle and relatively to said car body, means supported by said axle for supporting said frame, rollers carried by said frame, a track supporting the car body and supported by said rollers and having arcuate vertically curved recesses in which said rollers are respectively located, the recesses being so disposed that the weight of the car body will normally force the frame and axle to the straight ahead position, and auxiliary yielding means connecting the frame and car body for normally forcing the frame to the straight ahead position.

25. In a car truck, two members comprising a car body and a centrally pivoted truck frame revoluble relatively thereto, an axle revoluble with the truck frame, a track carried by one of said members and having an arcuate runway curved in cross section, and rollers carried by the other member and adapted to travel in said runway and having treads curved in cross section.

26. In a car truck, two members comprising a car body and a centrally pivoted truck frame revoluble relatively thereto, an axle revoluble with the truck frame, a track carried by one of said members and having a horizontally arcuate vertically curved runway curved in cross section, and rollers carried by the other member and adapted to travel in said runway and having treads curved in cross section.

27. In a car truck, two members comprising a car body and a centrally pivoted truck frame revoluble relatively thereto, an axle revoluble with the truck frame, rollers carried by one of said members, and having treads curved in cross section, and a track carried by the other member and having a horizontally arcuate runway curved in cross section in which said rollers are adapted to travel and provided with means by which the weight of the car will normally force the frame and axle to the straight ahead position.

28. In a car truck, two members comprising a car body and a centrally pivoted truck frame revoluble relatively thereto, an axle revoluble with the truck frame, rollers carried by one of said members and having treads curved in cross section, and a track carried by the other member and having a horizontally arcuate vertically curved runway curved in cross section in which said rollers are adapted to travel, the runway being so disposed that the weight of the car will normally force the truck frame and axle to the straight ahead position.

In testimony whereof I have signed my name to this specification in presence of two subscribing witnesses.

FRED STEFFENS.

Witnesses:
 THEO. RIESENMEY,
 CARL WENDLER.

Copies of this patent may be obtained for five cents each, by addressing the "Commissioner of Patents, Washington, D. C."